United States Patent [19]
Girguis

[11] 3,798,927
[45] Mar. 26, 1974

[54] PROTECTIVE HOUSING FOR CONSTANT VELOCITY UNIVERSAL JOINTS

[75] Inventor: Sobhy Labib Girguis, Troisdorf, Germany

[73] Assignee: Uni-Cardan AG, Postfach, Germany

[22] Filed: Jan. 26, 1973

[21] Appl. No.: 326,672

[30] Foreign Application Priority Data
Feb. 8, 1972 Germany............................ 2205798

[52] U.S. Cl. .......................... 64/32 F, 64/21, 64/8
[51] Int. Cl. ........................................... F16d 3/30
[58] Field of Search ................ 64/21, 32 F, 8, 32 R

[56] References Cited
UNITED STATES PATENTS

| | | | |
|---|---|---|---|
| 2,323,569 | 7/1943 | Rzeppa............................ | 64/32 F |
| 3,017,756 | 1/1962 | Sharp............................... | 64/21 |
| 3,362,193 | 1/1968 | Ritsena............................ | 64/32 F |
| 3,452,558 | 7/1969 | Cull et al. ....................... | 64/21 |
| 3,688,521 | 9/1972 | Smith.............................. | 64/21 |

Primary Examiner—Benjamin W. Wyche
Assistant Examiner—Randall Heald
Attorney, Agent, or Firm—Edmund M. Jaskiewicz

[57] ABSTRACT

A constant velocity universal joint has driving and driven elements which are angularly displaceable with respect to each other and a torque is transmitted between these joint elements by a plurality of rolling elements retained in a cage. The cage traverses only one half of the bending angle between the driving and driven elements. A protective housing comprising one or more flexible sleeve elements is fastened to both the driving and driven elements to span and enclose the space therebetween. The protective housing has an intermediate portion or portions thereof also fastened to the cage or to the control element within the cage or both.

10 Claims, 9 Drawing Figures

PROTECTIVE HOUSING FOR CONSTANT VELOCITY UNIVERSAL JOINTS

The present invention relates to a constant velocity universal joint having driving and driven elements which are angularly displaceable with respect to each other and between which torque is transmitted by a plurality of rolling bodies retained in a cage, more particularly, to a protective housing for such a universal joint.

It has been known to provide such constant velocity universal joints with a protective housing or sleeve which extends over the entire space between the driving inner joint part and the driven outer joint part. Accordingly, the protective housing is subjected to the entire relative displacement between these joint elements. Where the universal joint is of the fixed-type and there is no relative axial displacement between the joint elements the protective sleeve must span the entire bending angle. Where the universal joint is of the sliding-joint type in which there is relative axial displacement between the joint elements the protective sleeve must additionally span the entire range of displacement. Should there be any failure or breakdown in the protective sleeve there will consequently be a failure in the lubrication which could easily result in the failure of the joint.

In order to reduce the possibility of contact between folds or corrugations of the sleeve, the sleeve must be made relatively large. It is apparent that contact of the folds would produce excessive wear of the sleeve and that concentrated bending of the folds in certain localized areas would produce fatigue stress which also would lead to failure of the sleeve. To provide a sleeve which overcomes the problems of fold contact and bending requires a correspondingly larger space and thus a higher cost and also requires a greater amount of lubricant in order to fill the sleeve. It thus becomes extremely difficult to construct a protective sleeve having a section and wall thickness relationship in accordance with these conditions. In addition, the proper designing of such a protective sleeve involves narrow tolerances both with regard to the shape and wall thickness of the sleeve.

A further problem with such protective housings is that the higher temperatures in the vicinity of the joint resulting from the transmission of power through the joint causes an inflation of the sleeve. This occurs because of the presence of air in the sealed space enclosed by the housing and also by the presence of gases which may have been dissolved in the lubricant. The heating of the air and possibly the gases subjects the protective housing to strong stresses particularly in its central portion as well as at those portions which are attached to elements of the joints. The inverse condition, namely a contraction, occurs at low temperatures of the surrounding atmosphere.

In the case of the such protective sleeves used on constant velocity universal joint employed in motor vehicles, under cold weather conditions and in colder geographical areas it occurs frequently that the lubricant which has settled in the lower portion of the sleeve will harden after the vehicle remains standing for a period of time. Upon starting of the vehicle, the unbalance brought about by the hardened mass of lubricant in one portion of the sleeve imposes severe stressing of the central portion of the sleeve as well as those areas of the sleeve which are attached to the inner and outer joint elements.

In those applications where the universal joint is rotated at a relatively high speed, the sleeve itself as well as those areas of the sleeve which are attached to the joint elements are highly stressed because of the centrifugal forces acting on the lubricant and on the sleeve. Therefore, constant velocity universal joints cannot be employed in many cases, such as in the drive shafts of motor vehicles, if the universal joint would be subjected to relatively large bending angles and relatively great axial displacement. Under these circumstances it is necessary, that the sleeve meet a number of different and mutually opposite requirements. For example, the universal joint must be small in size in order to avoid unnecessary increase of the interior dimensions of the joint and the joint should have a certain rigidity, while on the other hand the joint must be sufficiently large and flexible to permit deflection of the joint elements over the entire angle and accommodate the axial displacement between the joint elements.

Other apparently contradicting requirements call for the material of the sleeve to be relatively rigid in the enlarged diameter portions of the sleeve which are subjected to greater centrifugal forces, while on the other hand a relatively softer material should be used in order to permit angular and axial flexing of the protective sleeve.

It is therefore the principal object of the present invention to provide a novel and improved protective housing for a constant velocity universal joint as described herein.

It is another object of the present invention to provide such a protective housing which is subjected to reduced stresses in its central portion and those portions which are attached to elements of the joint and wherein the distance spanned by portions of the sleeve between points of attachment is significantly reduced.

It is an additional object of the present invention to provide such a protective housing whose dimensional relationship can be readily determined and in which materials having different characteristics can be used for several portions of the housing.

It is a further object of the present invention to provide such a protective housing which has increased safety characteristics under operating conditions and which does not contribute to failure of the universal joint.

The objects of the present invention are achieved and the disadvantages of the prior art as described above are eliminated by the present invention. The present invention essentially discloses a protective housing for a constant velocity universal joint which has driving and driven elements and a cage retaining rolling elements for transmitting torque between the driving and driven elements. According to one aspect of the present invention the protective housing may comprise flexible sleeve means including one or more sleeve elements fastened to the driving and driven elements of the joint to enclose the space therebetween. A portion of the sleeve is fastened to the cage. The sleeve means may be divided at the portion fastened to the cage to define a plurality of sleeve elements which may overlap at the cage fastening. The several elements of the sleeve may be of materials having different characteristics. The protective housing of the present invention can be applied to such a constant velocity universal joint having a control element therein and can also be applied to both fixed joint and sliding joint universal joints.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
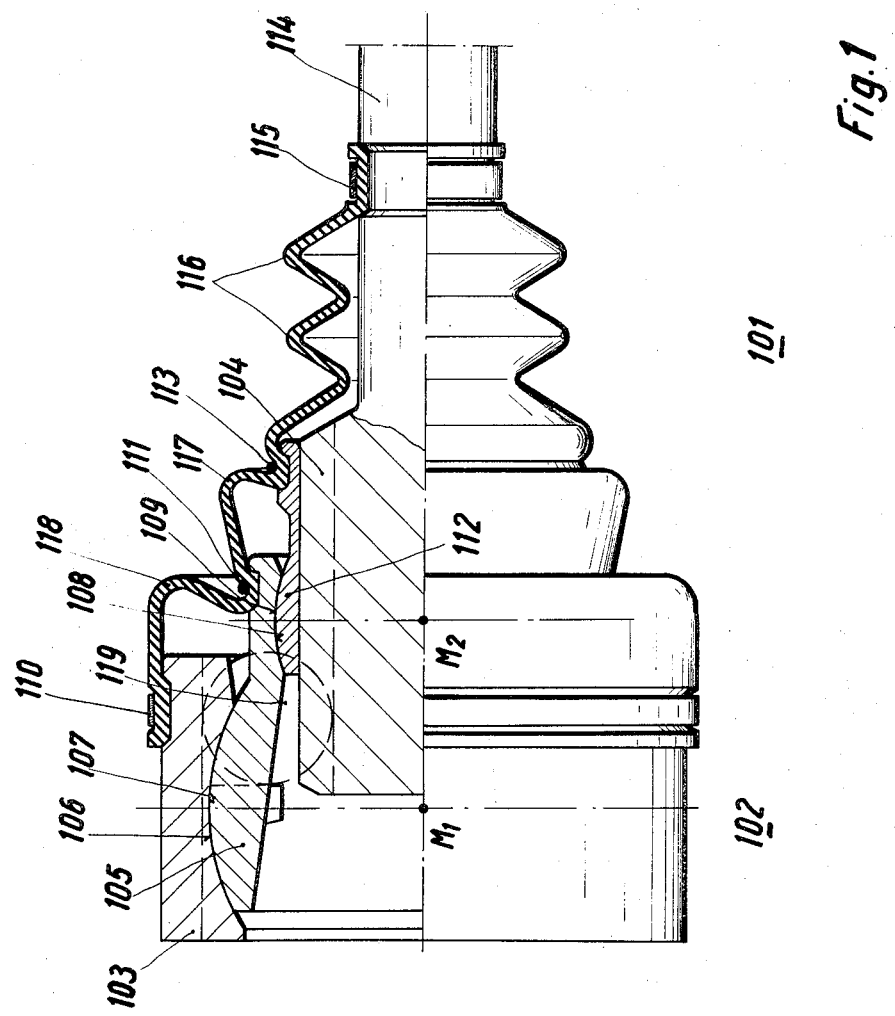
FIG. 1 is a half longitudinal sectional view of a constant velocity sliding universal joint having a protective housing attached to both the cage and the control element.

In FIG. 1 there is illustrated a constant velocity sliding universal joint 102 which is enclosed and sealed by a flexible protective housing or sleeve 101. The protective housing is formed of a suitable flexible material such as rubber or a synthetic material having physical characteristics similar to rubber. The materials may include other elastomers, particularly Neoprene, Chloroprene, polyurethane and the like which are known in the art.

The universal joint 102 comprises an outer joint element 103 which is the driven element, an inner joint element 104 which is the driving element and a cage 105 which retains a plurality of balls 119 for transmitting the torque between the driving and driven elements. There is also provided a control element 112. The joint elements 103 and 104 each are provided with parallel longitudinally extending grooves on their opposing surfaces for receiving the balls 119. The cage 105 has an outer spherical surface 106 which is movably supported in a corresponding concave spherical surface 107 formed in the outer joint element 103. In addition, cage 105 is provided with a concave spherical surface 108 which movably receives a convex spherical surface 109 on the control element 112. The centers of the cage spherical surfaces 106 and 108 are located equidistantly on both sides of a plane passing through the centers of the balls 119. The inner joint element 104 is axially displaceable with respect to the control element 112 and the cage 105 or outer joint element 103.

The protective sleeve 101 has an end thereof attached at 110 on the outer joint element 103 and is provided with a fold or corrugation 118 before a point of attachment 111 on the cage 105. This fold 118 thus absorbs the bending between the outer joint element 103 and the cage 105 about a common pivot point $M_1$ which is equivalent to one-half of the angle of deflection or bending between the inner and outer elements of the universal joint. It is characteristic of constant velocity universal joints that the cage traverses only one half of the bending angle and the position of the cage thus provides an exact division of the bending angle and, depending on the type of the joint, also of the path of displacement.

Proceeding along the protective housing 101 from the attachment point 111, the housing is provided with a further fold 117 and is attached at 113 onto the control element 112. The fold 117 also absorbs one-half of the bending angle which is that portion of the angle traversed by the inner joint element 104 with respect to the cage 105 about a common pivot $M_2$.

The inner joint element 104 is axially displaceable with respect to the control element 112 and accordingly, this portion of the protective housing has a plurality of folds 116 to accommodate this axial displacement. The sleeve is attached at 115 onto the shaft 114 of the inner joint element 104.

Each attachment portion of the protective housing comprises an angular groove in the outer face of the housing and a securing band or ring, such of a metal, is disposed in each of these grooves.

Thus, in this embodiment the protective sleeve 101 consists of a single element which is fastened between its end attachment 110 and 115 on the driving and driven elements 114 and 103 and at two intermediate fastening points 11 and 113 on the cage 105 and control element 112, respectively.

Figure 2:
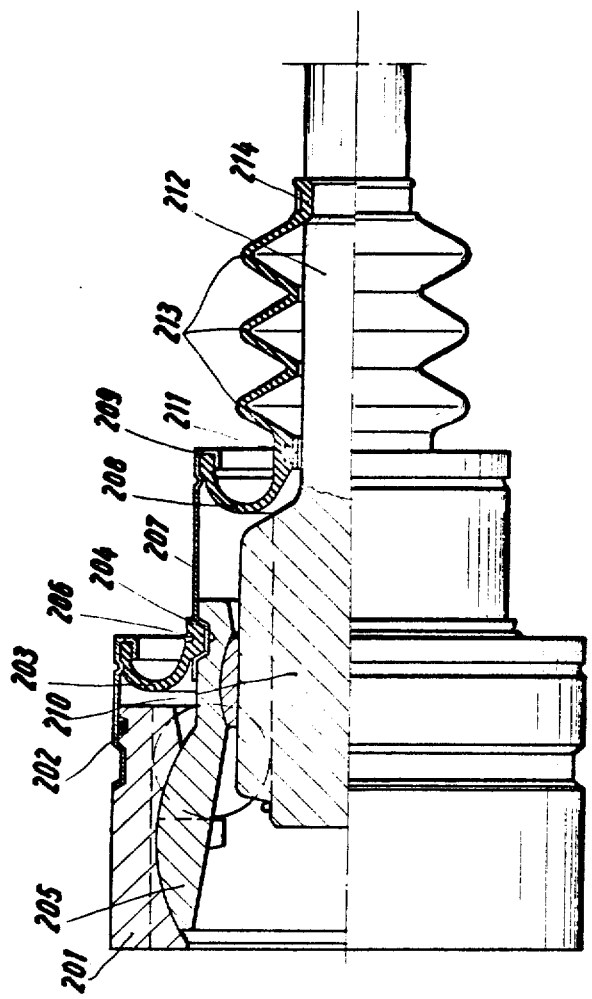
FIG. 2 is a similar view of a similar joint having a two-part protective sleeve.

In FIG. 2 there is illustrated a constant velocity sliding universal joint which is structurally similar to the universal joint of FIG. 1. The protective sleeve comprises two parts 203 and 208. The outer peripheral edge of the annular sleeve part 203 has a thickened or beaded portion which is clamped within a groove formed in a metal cylindrical jacket 202 attached to the outer joint element 201. The inner annular end of sleeve part 203 is attached to the cage 205 at 204 by a beaded portion which is seated in an annular groove formed in metal jacket 207 and seated in a corresponding groove of cage 205. A locking ring 206 secures the inner edge of the sleeve part 203 within the jacket groove. The jacket 207 extends in an axial direction with respect to the joint and at its outer end has an attachment point 209 within which is clamped a thickened or beaded portion on the outer peripheral edge of the second sleeve part 208. Sleeve part 208 comprises a single fold extending in a curve which spans the bending angle of the inner joint element 210 with respect to cage 205. The fold 208 has a portion thereof which is connected to a ring 211 slideably positioned on shaft 212 on inner joint element 210 so as to be axially displaceable thereon.

From the attachment portion on ring 211 the sleeve part has a plurality of corrugations or folds 213 which bridge or span the displacement path. The outer end of the sleeve part 208 is attached at 214 to the shaft 212 by a locking ring or similar fastening device.

Since the sleeve part 203 spans and seals the space between outer joint element 201 and cage 205 it is subjected to one-half of the bending angle of the joint. The length of the metallic sleeve 207 is related to the length of the path of displacement of the inner joint element 210 with respect to cage 205 or outer joint element 201. The fold 208 of the second sleeve part spans half the bending angle between the inner joint element 210 and cage 205. This angle also corresponds to one-half of the total angle of bending or deflection. The sliding ring 211 functions to secure sleeve part 208, 213 against centrifugal forces and also, subdivides this sleeve part 208, 213 into a portion that absorbs bending of the joints and into a portion that absorbs displacement of the joint.

Figure 3:
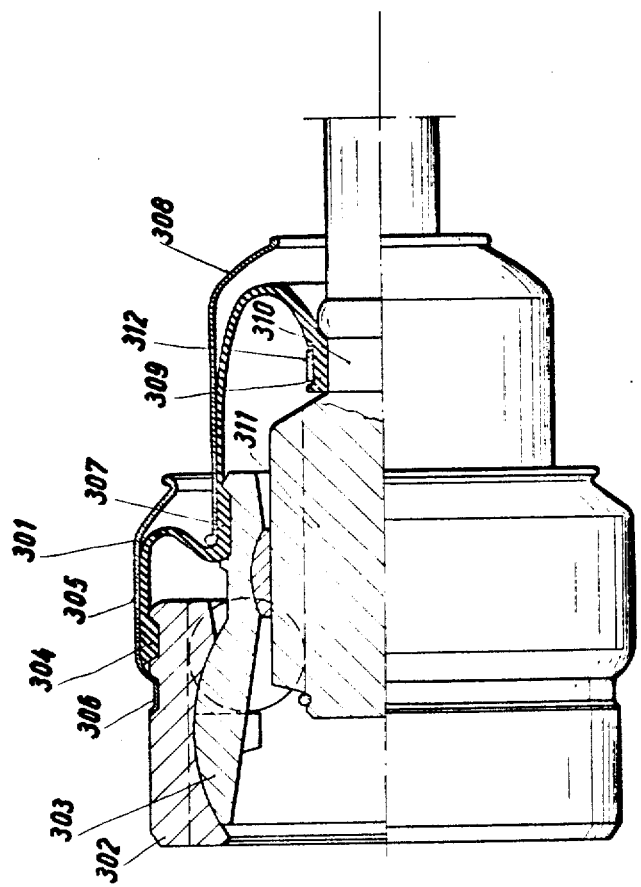
FIG. 3 is a similar view of a similar joint showing a one-part protective sleeve.

The protective sleeve illustrated in FIG. 3 is in one part. A portion of the sleeve indicated at 301 located between an outer joint element 302 and a cage 303 is provided with a thickened portion or a bead 304 that is positioned in an annular groove in the outer face of the outer joint element 302. A substantially cylindrical metal jacket 305 slides over the sleeve portion 301 and retains this sleeve portion in position by maintaining the bead 304 in the groove. The jacket 305 is held against any axial displacement by an inner lip portion 306 that is seated within a second groove in the outer joint element 302. A thickened intermediate portion 307 of the sleeve is seated in an annular recess formed in the outer face of cage 303. This thickened portion 307 is secured firmly in position on the cage 303 by means of a cylindrical metal jacket 308 that slides over this thickened portion 307 and thus protects the sleeve 301.

Proceeding from the thickened portion 307 the protective sleeve is curved rearwardly and is provided at its end with a bead 309 which is slid over a shaft 310 of an inner joint element 311 and is positioned between two annular shoulders. This end 309 of the sleeve is fastened with respect to shaft 310 by a clamping ring or band 312. The metallic jackets 305 and 208 function to protect the flexible sleeve from mud, gravel and rocks and other solid objects which might cause destruction of the sleeve. By forming the outer protective jackets or casing 305 and 308 in two elements, the axial openings in this jackets 305 and 308 can be made relatively small since it is necessary that they accommodate only one-half of the bending angle of the joint. Minimizing of these axial openings is advantageous since it provides protection against the entrance of foreign bodies such as stones and the like.

Figure 4:
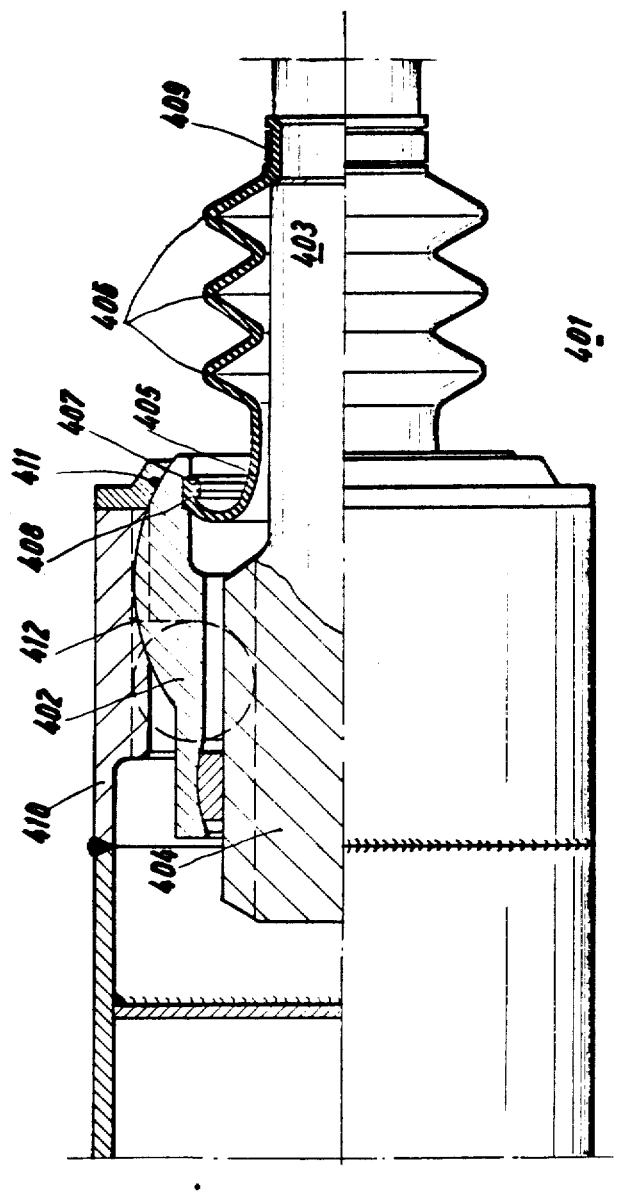
FIG. 4 is a half longitudinal section of a constant velocity sliding universal joint having a modified protective housing.

In FIG. 4 there is illustrated a constant velocity universal joint sealed by a protective housing which does not span the entire bending angle of the joint but only spans the space between a cage 402 and a shaft 403 of an inner joint element 404. The sleeve is provided with a curved portion 405 which participates in the bending of cage 402 with respect to the inner joint element 404 or shaft 403 and also a portion 406 which spans the path of axial displacement. The sleeve 401 is further provided with a beaded portion 407 which is secured in an annular groove in the inner space of cage 402 by clamping rings 408. Further, the sleeve 401 is sealed with respect to shaft 403 by a clamping ring or band 409.

The sealing of the universal joint throughout the bending angle of an outer joint element 410 with respect to cage 402 is accomplished by a sealing ring 411 which is positioned in a groove in the inner face of outer joint element 410 and sealingly engages the spherical outer surface 412 of cage 402.

Figure 5:
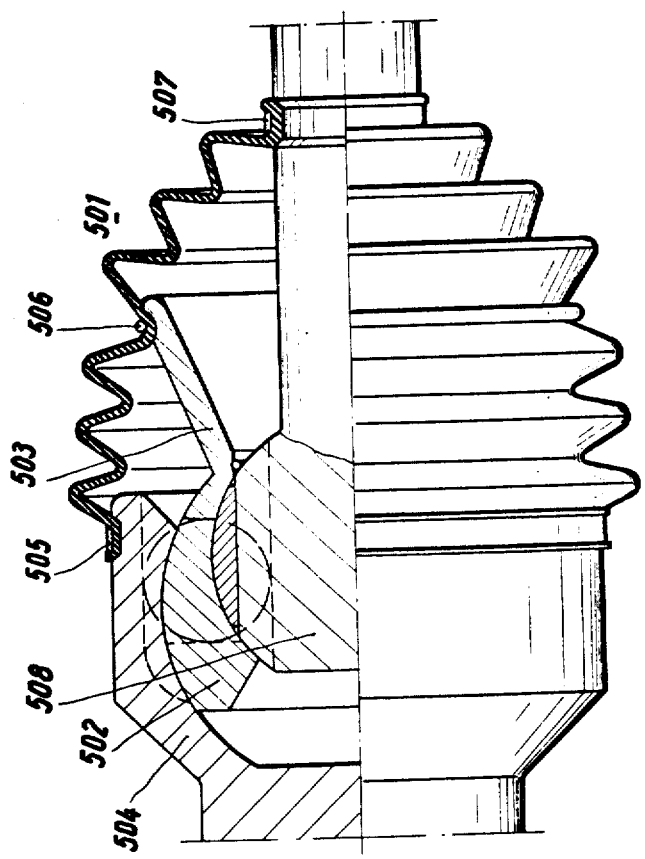
FIG. 5 is a half longitudinal sectional view of a constant velocity fixed universal joint having a one-part protective housing with a portion thereof attached to the cage.

In FIG. 5 there is shown a one-part sleeve 501 employed in a fixed universal joint for relatively large bending angles. A cage 502 is provided with a funnel-shaped extension 503 whose angle taper corresponds approximately to the bending angle of the point. The sleeve 501 has a bead at one end which is retained in a groove in the outer joint element 504 by means of a clamping ring 505 or similar securing device. An intermediate portion of sleeve 501 is fastened by a clamping ring 506 in a groove or recess on the outer peripheral surface of cage extension 503 in the area of its open end. The sleeve 501 is also fastened to an inner joint element 508 or its shaft by means of a clamping ring 507 to seal the joint.

Figure 6:
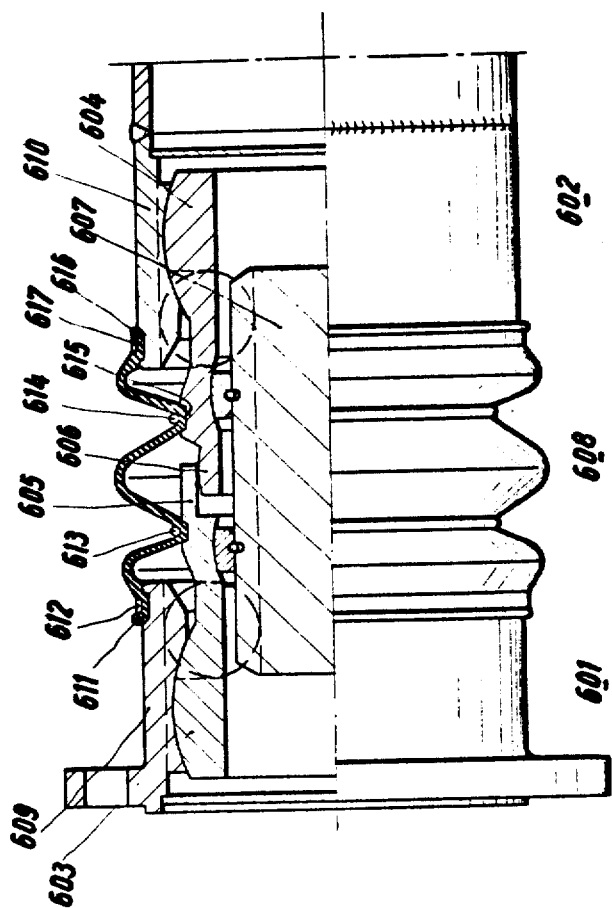
FIG. 6 is a half longitudinal sectional view of a double constant velocity universal joint having a protective housing attached to both of the cages.

In FIG. 6 there is shown a modification of the present invention as applied to a double constant velocity universal joint. The double joint essentially comprises two separate constant velocity universal joints 601 and 602 similar in structure to the universal joint in FIG. 1 but being of the fixed joint type. The cages 603 and 604 of the respective joints are provided with extensions 605 and 606 that are engageable so as to guide each other. In addition, the two universal joints 601 and 602 are provided with a common inner joint element 607. A protective housing or sleeve 608 spans and encloses the free space between the outer joint elements 609 and 610. In this modification the outer joint element 609 of the universal joint 601 is considered the driving element and the outer joint element 610 of the universal joint 602 is the driven element. The same relationship would exist for double universal joints that do not include a centering of the cages opposite each other.

The protective sleeve is provided with a thickened portion or bead 611 at one end which is positioned in a correspondingly shaped annular groove on the outer joint element 609 of universal joint 601 and is held in position at this point by a clamping ring 612 or similar device. Proceeding from its end 611 the protective sleeve 608 has a fold or corrugation and is fastened onto cage 603 on the universal joint 601 by means of a locking or clamping ring 613 which presses this portion of the sleeve into a recess on the peripheral surface of cage 603. This first fold absorbs the bending of outer joint element 609 of universal joint 601 with respect to its cage 603. A further fold is provided in the sleeve 608 to span the range of bending performed by cages 603 and 604 with respect to each other. Sleeve 608 is fastened onto cage 604 of the second universal joint 602 by a spring ring 614 which urges this portion of the sleeve 608 into a groove 615 formed in the outer peripheral surface of cage 604. The end of sleeve 608 is attached to the outer joint element 610 of universal joint 602 and sealed with respect to this outer joint element by means of a bead 616 in the end of the sleeve and seated in a corresponding groove in the outer joint element 610. A clamping ring 617 retains the bead 616 in the groove.

Figure 7:
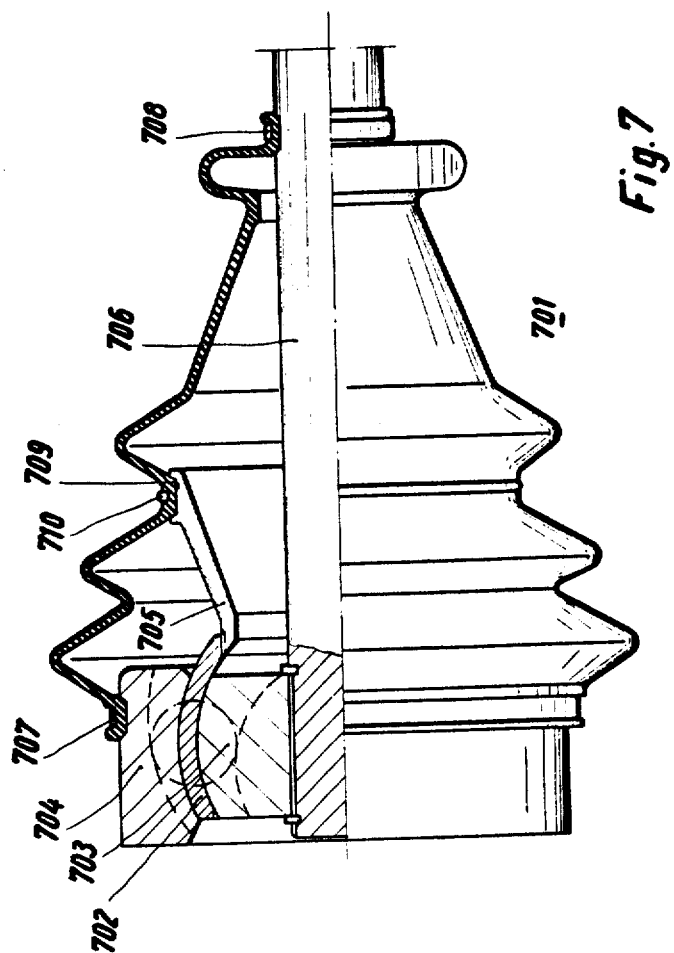
FIG. 7 is a half longitudinal sectional view of a constant velocity universal joint having a modified cage construction and enclosed by a one-part protective housing.

In FIG. 7 there is shown a constant velocity universal joint of the fixed type comprising curved races which are parallel in the axial direction of the joint and the centers of curvature of the races are positioned on the axis of the joint but displaced with respect to each other so that upon bending of the joint, cage 702 is guided to one-half of the bending angle by the balls held in the races. This universal joint is sealed by a unitary protective sleeve 701. The cage 702 is positioned between the spherical outer surface of an inner joint element 703 and the concave spherical surface of outer joint element 704. The cage 702 is provided with a conical extension 704 similar to that of the universal joint in FIG. 5. The protective sleeve 701 is fastened at its ends to the outer joint element 703 by a band 707 and shaft 706 which is connected to the inner joint element 703 by a band 708. An intermediate portion of the sleeve is positioned in an annular groove 709 in the conical extension 705 by means of a clamping ring 710. The corrugations of sleeve 701 are so constructed so as to participate in the bending occurring between the points of attachment of protective sleeve 701.

Figure 8:
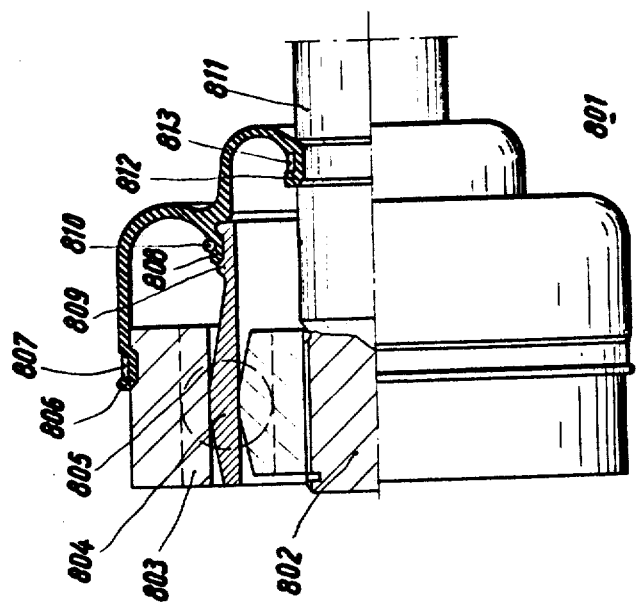
FIG. 8 is a half longitudinal sectional view of a constant velocity universal sliding joint having another form of cage construction and provided with a one-piece protective sleeve.

In FIG. 8 a protective sleeve 801 seals a constant velocity universal joint wherein the balls transmitting the torque are positioned in races that extend in the axial direction of the joint in pairs toward each other or away from each other and the races of an inner joint element 802 and an outer joint element 803 intersect each other. A cage 804 is guided by balls 805 through one half of the bending angle and during displacement of the inner joint element with respect to the outer joint element the cage traverses half of the displacement path. Its curved outer surface guides cage 804 in the cylindrical inner space of the outer joint element 803. The larger diameter portion of sleeve 801 is placed over the outer joint element and retained in a groove in the outer joint element by means of a clamping ring 807 urging a bead 806 into the groove. From this point of attachment the sleeve 801 has a substantially constant outer diameter and then tapers inwardly in a curve to form an inward projection 808 extending toward the cage with this projection being seated in a groove formed in an extension 809 of the cage 804. A spring ring 810 or similar device fastens the sleeve at this point to the cage extension.

The outer diameter of sleeve 801 then tapers away from its projection 808 and curves back toward the cage to define a diameter which corresponds approximately to the outer diameter of a shaft 811 upon which is mounted the inner joint element 802. This end of the sleeve is also provided with a thickened portion or bead 811 which is seated into a groove in the shaft 811 fixed in place by a clamping ring 813.

Figure 9:
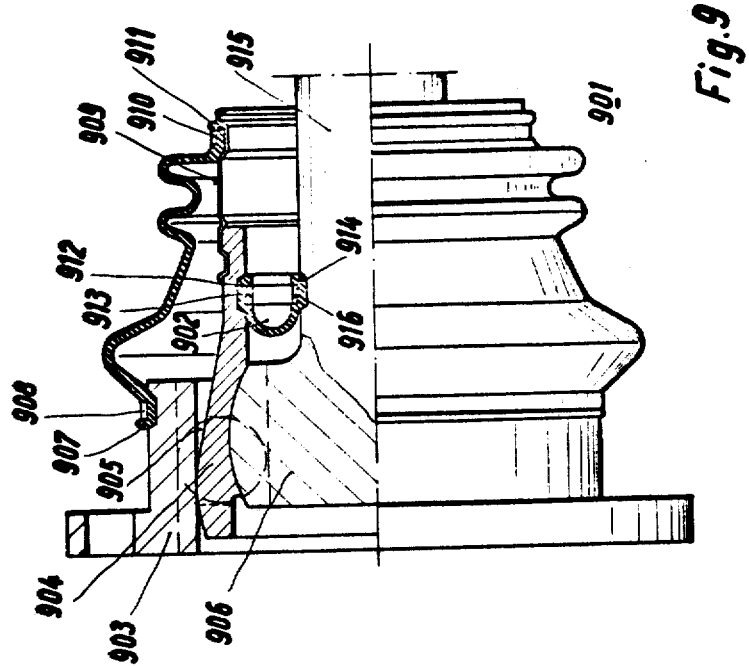
FIG. 9 is a constant velocity sliding universal joint provided with a two-part protective sleeve.

In FIG. 9 there is illustrated a protective sleeve having two parts 901 and 902 as applied to a constant velocity universal joint of the sliding joint type. This universal joint has an outer joint element 903 provided with a plurality of races positioned over its periphery and parallel to the axis. A cage 904 is positioned within the cylindrical cavity of outer joint element 903 to retain a plurality of balls 905 to transmit torque between the inner and outer joint elements of the universal joint. The cage 904 has a spherical outer surface which is displaceably engageable within the outer joint element. The cage 904 is also provided with a concave spherical surface which receives a spherical peripheral surface of inner joint element 906. The cage 904 and inner joint element 906 are positioned against axial displacement with respect to each other.

The first or outer sleeve part 909 absorbs the bending between outer joint element 903 and cage 904 as well as the displacement of these two elements with respect to each other. One end of sleeve part 901 is secured to the outer periphery of outer joint element 903 by a clamping ring or band 908. The other end of the sleeve part 901 is attached to the end of a metallic jacket or shell 909 which extends outwardly from the cage 904. A clamping ring 910 retains a thickened or beaded portion 911 of sleeve part 901 within a correspondingly shaped groove in the outer end of the jacket 909. The jacket 909 spans the path of axial displacement in order to provide additional space for the location of several folds in the sleeve part 901. The fold immediately adjacent to the beaded end 907 absorbs bending between the outer joint element 903 and cage 904. The folds immediately adjacent to the beaded end 911 absorb and compensate for the displacement of cage 904 with respect to the outer joint element 903.

Second sleeve part 902 seals aand encloses the joint between cage 904 and inner joint element 906 and merely compensates for any variance of distance resulting from a bending of cage 904 with respect to the inner joint element 906. For this purpose, one end of sleeve part 903 is provided with a bead which is secured by clamping ring 913 in a groove formed in the hollow inner space of cage 904. The other end of sleeve part 902 is retained by means of a further beaded portion 914 by a clamping ring or band 916 in an annular groove in shaft 915 upon which is mounted the inner joint element 906.

Thus it can be seen that the present invention has provided an effective protective or sealing housing which spans and encloses the space between the elements of a constant velocity universal joint of either the fixed or sliding type. The protective housing may comprise several components made of different materials, such as resilient materials or a metal in order to perform more effectively the functions of this protective housing. In addition, the protective housing is securely attached so as not to be adversely affected by centrifugal forces exerted on the protective housing when the universal joint is operating at relatively high speeds. The attachments of the housing to the several components of the universal joint are relatively simple and can be accomplished with a minimum of effort.

It will be understood that this invention is susceptible to modification in order to adapt it to different usages and conditions, and accordingly, it is desired to comprehend such modifications within this invention as may fall within the scope of the appended claims.

What is claimed is:

1. A protective housing for a constant velocity universal joint having driving and driven elements and a cage retaining rolling elements for transmitting torque between the driving and driven elements, comprising flexible sleeve means fastened to said driving and driven elements to enclose the space therebetween and having a portion thereof fastened to said cage.

2. A protective housing as claimed in claim 1 wherein said fastened portion is intermediate the fastenings to the driving and driven elements.

3. A protective housing as claimed in claim 1 wherein said sleeve means comprises a plurality of sleeve elements.

4. A protective housing as claimed in claim 1 wherein said sleeve means is divided at the portion fastened to said cage to define a plurality of sleeve elements.

5. A protective housing as claimed in claim 4 wherein said sleeve elements overlap at the fastenings to said cage.

6. A protective housing as claimed in claim 3 wherein said sleeve elements are of materials having different characteristics.

7. A protective housing as claimed in claim 1 wherein the constant velocity universal joint includes a control element associated with said cage and retained against axial displacement with respect to said cage, and a second portion of said sleeve means is fastened to said control element.

8. A protective housing as claimed in claim 1 wherein the driving and driven elements of said constant velocity universal joint are movable axially with respect to each other, an annular member axially movable on an axially movable joint element between the fastening of said sleeve means to the cage and the fastening thereof to said axially movable joint element, and a portion of said sleeve means is fastened to said annular member.

9. A protective housing as claimed in claim 1 wherein the constant velocity universal joint comprises two such joints in which the outer joint element of one universal joint is the driving element and the outer joint element of the other universal joint is the driven element and an inner joint element common to both universal joints connects said universal joints in driving relationship, said flexible sleeve means having a first portion thereof fastened to the cage of one universal joint and a second portion thereof fastened to the cage of the second universal joint.

10. A protective housing as claimed in claim 4 wherein the portion of the said sleeve means between one joint element and said cage comprises a rigid annular element sealingly engageable with said cage and the portion of said sleeve means between said cage and the other joint element comprises a flexible corrugated element.

* * * * *

UNITED STATES PATENT OFFICE
CERTIFICATE OF CORRECTION

Patent No. 3,798,927        Dated March 26, 1974

Inventor(s)  Sobhy Labib Girguis

It is certified that error appears in the above-identified patent and that said Letters Patent are hereby corrected as shown below:

Insert Figures 2 through 9, as part of Letters Patent.

Signed and sealed this 24th day of September 1974.

(SEAL)
Attest:

McCOY M. GIBSON JR.
Attesting Officer

C. MARSHALL DANN
Commissioner of Patents